(12) United States Patent
Kominsky et al.

(10) Patent No.: US 7,109,467 B2
(45) Date of Patent: Sep. 19, 2006

(54) METHOD AND SYSTEM FOR SPREAD SPECTRUM GATING

(75) Inventors: Richard Allen Kominsky, Westfield, MA (US); Jerry Raymond Long, Huntington, MA (US); James Hoge Bowen, Salem, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 122 days.

(21) Appl. No.: 10/765,657

(22) Filed: Jan. 26, 2004

(65) Prior Publication Data
US 2005/0161588 A1    Jul. 28, 2005

(51) Int. Cl.
*H01J 31/50* (2006.01)
*H01J 43/30* (2006.01)
(52) U.S. Cl. .............................. 250/214 VT; 250/207; 313/532
(58) Field of Classification Search ......... 250/214 VT, 250/214 LA, 214 A, 207; 313/532, 533
See application file for complete search history.

(56) References Cited

U.S. PATENT DOCUMENTS

| | | |
|---|---|---|
| 6,576,884 B1 | 6/2003 | Ostromek et al. |
| 2002/0195547 A1* | 12/2002 | Ostromek et al. .... 250/214 VT |

OTHER PUBLICATIONS

LTC6902 datasheet, "Multiphase oscillator with spread spectrum frequency modulation", 2003, Linear Technology, pp. 1-16.*

* cited by examiner

*Primary Examiner*—Thanh X. Luu
(74) *Attorney, Agent, or Firm*—Cantor & Colburn LLP

(57) ABSTRACT

A gating module for gating an image intensifier tube. The gating module includes a frequency generator generating a base signal having a base frequency. A modulator spread-spectrum modulates the base frequency of the base signal to generate a modulated signal. A gating circuit coupled to the modulator generates a gating signal in response to the modulated signal.

12 Claims, 4 Drawing Sheets

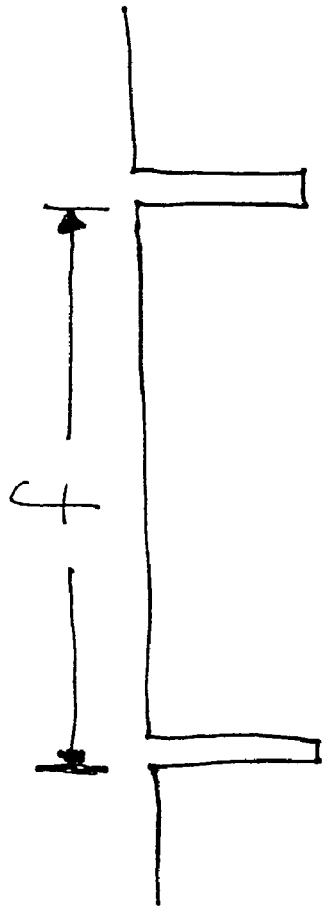
FIG. 4A
FIG. 4B
FIG. 4C

METHOD AND SYSTEM FOR SPREAD SPECTRUM GATING

BACKGROUND OF THE INVENTION

Night vision devices enable a user to view a scene with little or no visible ambient light. Law enforcement and military personnel often use night vision devices during night time surveillance and maneuvers. Night vision devices typically employ an image intensifier tube that amplifies light in order to provide an enhanced image to the user.

Gated night vision devices, however, are susceptible to interference associated with oscillatory ambient light, which causes bright flashes of light that interfere with the viewed image. Some systems attempt to avoid the interference by determining the frequency of the ambient light and then using a gating frequency that avoids the interference. A disadvantage of these systems is that interference may occur if the frequency of the ambient light changes. Additionally, these systems may experience interference if the ambient light includes multiple frequencies or does not follow a regular pattern. Consequently, avoiding interference has posed challenges for the design of gated night vision devices and other gated sensors.

Gating the cathode of image tubes combined with periodic scene brightness variations can produce intermodulation products, which fall within the band that is detectable by the human eye. Since it is not possible to predict the frequency of scene brightness variations, such as line frequency flicker at 50, 60, 100, 120 hz, or computer monitor flicker at frequencies between 15 hz and several hundred khz, intermodulation products can be generated in the visible range.

Furthermore, gating at a fixed frequency may produce a gating signal, which occurs at a frequency that is a mechanical resonant frequency of image tube elements. This makes the image tube assembly produce an audible sound. Audible emissions from a night vision system are undesirable.

BRIEF SUMMARY OF THE INVENTION

An embodiment of the invention is a gating module for gating an image intensifier tube. The gating module includes a frequency generator generating a base signal having a base frequency. A modulator spread-spectrum modulates the base frequency of the base signal to generate a modulated signal. A gating circuit coupled to the modulator generates a gating signal in response to the modulated signal.

Another embodiment of the invention is a system for viewing an object under low light conditions. The system includes an image intensifier tube generating an image of the object. A power supply provides power to the image intensifier tube. A gating module is coupled to the power supply. The gating module generates a spread-spectrum modulated gating signal to the power supply to provide gated power to the image intensifier tube.

Another embodiment of the invention is a method for gating an image intensifier tube. The method includes generating a base signal having a base frequency. The base frequency of the base signal is spread-spectrum modulated said to generate a modulated signal. A gating signal is generated in response to the modulated signal and applied to the image intensifier tube.

BRIEF DESCRIPTION OF THE DRAWINGS

Referring now to the drawings, wherein like elements are numbered alike in the several FIGURES:

FIGS. 4A–4C depict waveforms in the gating module.

DETAILED DESCRIPTION

Figure 1:
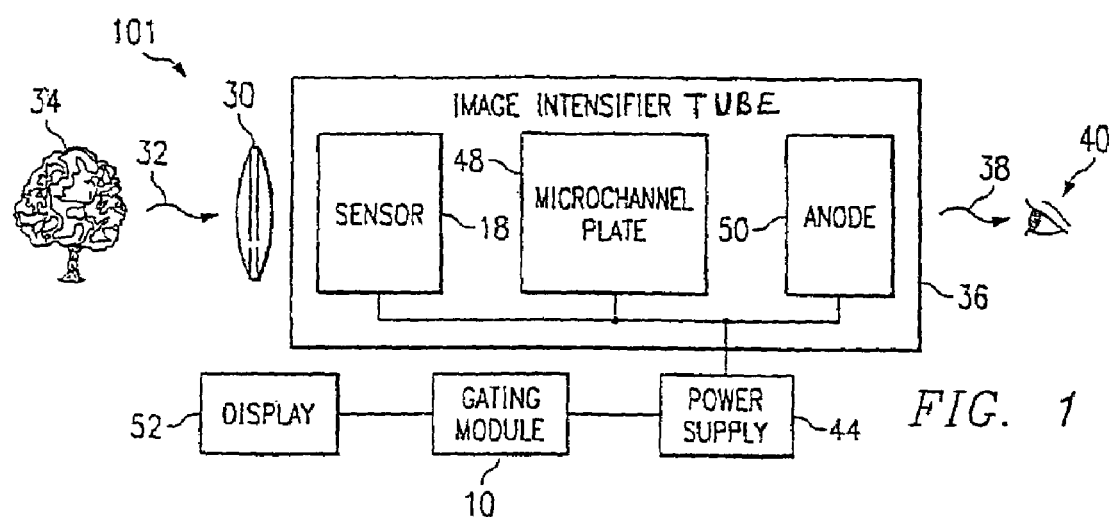
FIG. 1 is a block diagram of one embodiment of a system for viewing an object.

FIG. 1 is a block diagram of one embodiment of a system 101 for viewing an object under low light conditions. System 101 generally includes optics 30 that receive light 32 from a scene that includes an object 34 to be viewed. A gated sensor device, for example, an image intensifier tube 36, receives and amplifies light 32 to produce an image 38 of object 34 for a viewer 40. A gating module 10 provides a gating signal that directs a power supply 44 to supply a voltage to image intensifier tube 36 that reduces interference while amplifying light 32, thus improving image 38. In one embodiment, gating module 10 and power supply 44 may be integrated at a circuit design level.

In one embodiment, power supply 44 includes a source of electrical power, for example, a battery. Image intensifier tube 36 includes a sensor 18, a micro-channel plate 48, and an anode 50. Light 32 incident on sensor 18 causes photoelectrons to be emitted in proportion to the intensity of light 32. Micro-channel plate 48 multiples the photoelectrons, which flow to anode 50. Anode 50 provides image 38, which is transmitted to viewer 40.

Image intensifier tube 36 is gated on and off with a gating frequency to amplify light 32. In one embodiment, sensor 18 is gated. Any construction of sensor 18, micro-channel plate 48, and/or anode 50, however, may be gated. Sensor 18 may include a photo cathode or any other suitable imaging sensor, such as a charged couple device array or an infrared focal plane array. When image intensifier tube 36 is gated on, light 32 is amplified, and when image intensifier tube 36 is gated off, light 32 is not amplified. Although image intensifier tube 36 is used in this example, any gated sensor device may be used, for example, a photo multiplier tube, a biased semiconductor sensor, or a biased photo voltaic sensor. A display 52 displays information about light 32 to viewer 40.

Figure 2:
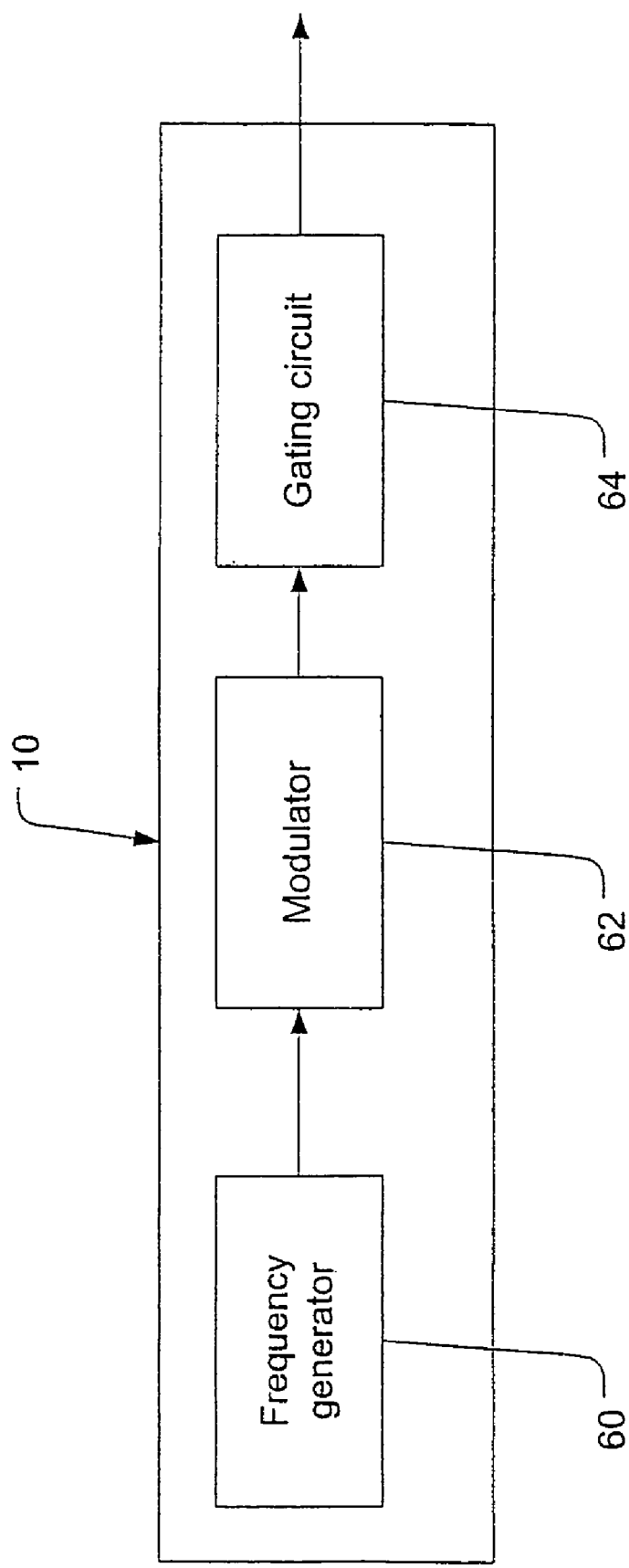
FIG. 2 is a block diagram of a gating module in one embodiment.

FIG. 2 illustrates an exemplary gating module 10 in embodiments of the invention. Gating module 10 includes a frequency generator 60 that generates a base signal having a base frequency for gating the image intensifier tube 36. A modulator 62 modulates the frequency of the base signal to provide a modulated signal. In exemplary embodiments, the modulator 62 provides a spread spectrum modulation. The percent of frequency modulation variation may be user-defined. The modulator 62 may be deactivated to provide the base signal to gating circuit 64. Gating circuit 64 generates a gating signal to the image intensifier tube 36, including sensor 18.

Figure 3:
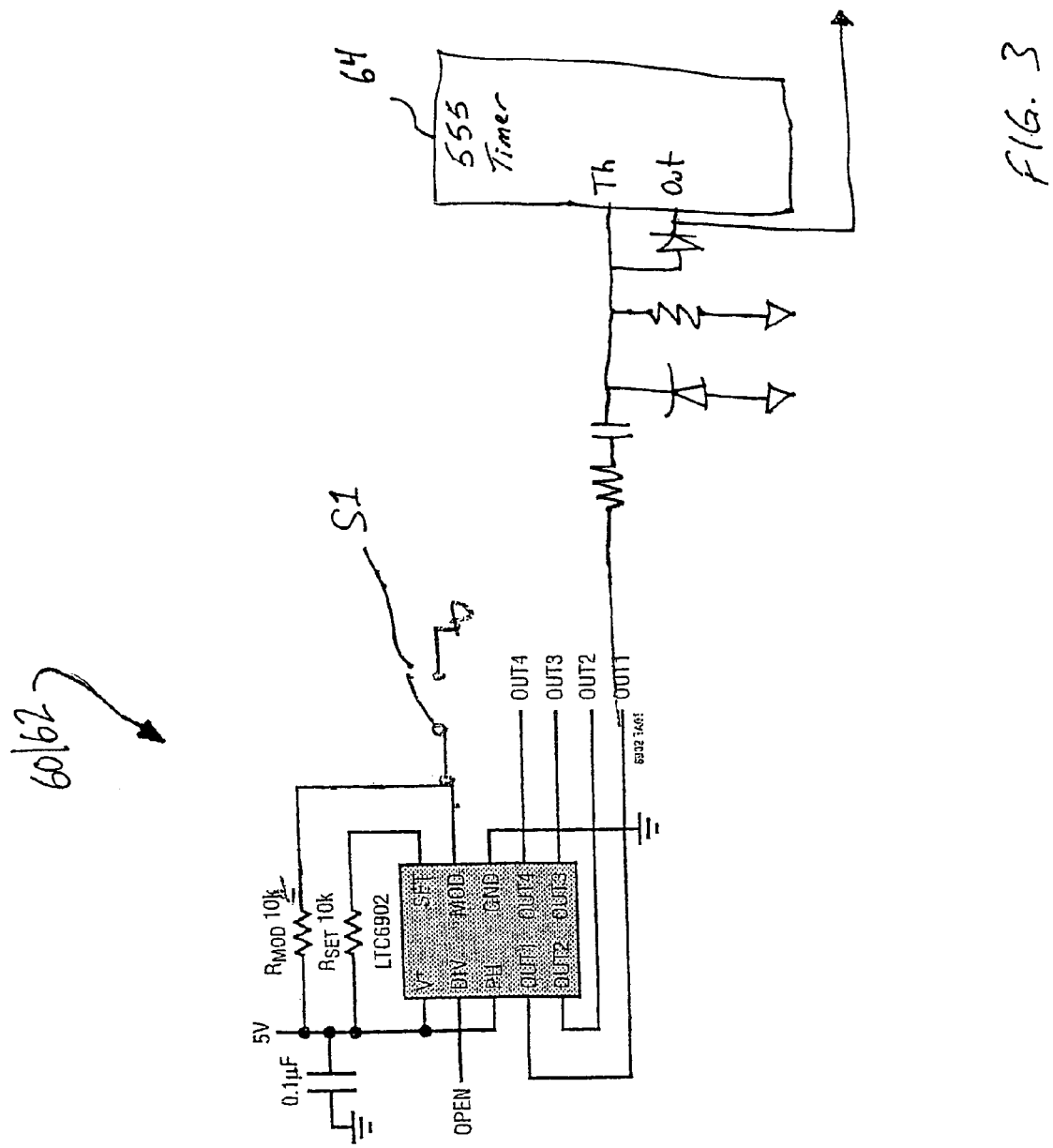
FIG. 3 is a schematic diagram of a gating module in one embodiment.

FIG. 3 is a schematic diagram of a gating module in one embodiment. The frequency generator 60 and modulator 62 are implemented using a Linear Tech LTC6902 multi-phase oscillator with spread spectrum frequency modulation. A first resistor Rset establishes the frequency of the base signal. A second resistor Rmod is used to set the modulation percentage of the base frequency. A switch S1 couples the modulation input of the oscillator to ground. When switch S1 is closed, modulation of the base signal is deactivated. In an embodiment of the invention, the resistors Rset and Rmod are selected to define a base frequency with 20% spread spectrum modulation added.

An output from the oscillator is provided to the threshold input of a 555 timer that is configured as a one-shot. The 555 timer produces a series of narrow low-logic level pulses, the pulse width of which is determined by resistor and capacitor component values connected to the 555 timer to form the one-shot circuit. The repetition rate of the pulses is controlled by the repetition rate of the signal from the spread spectrum oscillator 60/62.

The output of the 555 timer is fed through the transistor of an optocoupler which allows a feedback control circuit to vary the amount of current that passes through the optocoupler. The current charges a timing capacitor to a threshold known by a threshold detector. When the threshold is exceeded, the threshold detector controls a high voltage switch that applies a signal of the correct polarity to the image intensifier to turn the intensifier off. The intensifier remains off until the next period is initiated by the spread spectrum oscillator. By controlling the amount of current into the LED of the optocoupler, the current that charges the time capacitor can be varied, the rate at which it charges can be varied, the amount of time before the threshold is reached can be varied and the ON time of the image intensifier can be varied.

FIGS. 4A–4C depict waveforms in the gating module 10. FIG. 4A depicts voltage at the output of the modulator 62. The frequency f is randomly varied based on a user defined percentage established by resistor Rmod. FIG. 4B depicts a voltage at the input of gating circuit 64. In the embodiment shown in FIG. 3, this voltage appears at the threshold pin of the 555 timer. FIG. 4C depicts voltage at the output of the gating module 64.

Embodiments of the spread-spectrum gating are not limited to modulation of a base frequency as described above. Alternate embodiments include using a pseudorandom sequence generator as modulator 62. The oscillator 60/62 may also be implemented together as a band-limited random noise generator.

The use of a spread-spectrum modulated gating signal provides several advantages. Tests have verified that when spread spectrum gating was enabled there was a visual affect on flicker when looking at a CRT monitor. When spread-spectrum gating was enabled, the audible emissions caused by the image tube resonance were reduced. Tests have also verified that spread-spectrum gating reduces the amplitude of beat frequency (gating to scene) flicker. RF emissions will be reduced as the spread-spectrum gating reduces the amplitude of the power at any given frequency.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. A gating module for gating an image intensifier tube, the gating module comprising:
a frequency generator generating a base signal having a base frequency;
a modulator for spread-spectrum modulating said base frequency of said signal to generate a modulated signal; and
a gating circuit coupled to said modulator, said gating circuit generating a gating signal response to said modulated signal;
wherein said gating circuit is a one-shot.

2. A system for viewing an object under low light conditions, the system comprising:
an image intensifier tube generating an image of said object;
a power supply providing power to said image intensifier tube;
a gating module coupled to said power supply, said gating module generating a spread-spectrum modulated gating signal to said power supply to provide gated power to said image intensifier tube;
wherein said gating module includes:
a frequency generator generating a base signal having a base frequency;
a modulator for spread-spectrum modulating said base frequency of said base signal to generate a modulated signal; and
a gating circuit coupled to said modulator, said gating circuit generating said gating signal in response to said modulated signal.

3. The system of claim 2 wherein:
said image intensifier tube includes a sensor, a microchannel plate and an anode.

4. The system of claim 3 wherein:
said sensor is a photocathode sensor.

5. The system of claim 2 wherein:
said frequency generator and said modulator are implemented by an oscillator.

6. The system of claim 5 wherein:
said oscillator includes a first resistor establishing said base frequency.

7. The system of claim 6 wherein:
said oscillator Includes a second resistor coupled to a modulation pin of said oscillator, said second resistor establishing a percent of modulation of said base frequency.

8. The system of claim 7 wherein;
said oscillator includes a switch connecting said modulation input to ground, closure of said switch deactivating said modulating said base frequency.

9. The system of claim 5 wherein:
said oscillator is a band-limited random noise generator.

10. The gating module of claim 2 wherein:
said modulator is a pseudorandom sequence generator.

11. The system of claim 2 wherein:
said gating circuit is a one-shot.

12. A method for gating an image intensifier tube, the method comprising:
generating a base signal having a base frequency;
spread-spectrum modulating said base frequency of said base signal to generate a modulated signal;
generating a gating signal in response to said modulated signal; and
applying said gating signal to said image intensifier tube.

* * * * *